US006142443A

United States Patent [19]

Potschin et al.

[11] Patent Number: 6,142,443

[45] Date of Patent: Nov. 7, 2000

[54] VALVE FOR CONTROLLING FLUIDS

[75] Inventors: Roger Potschin, Brackenheim; Friedrich Boecking, Stuttgart, both of Germany

[73] Assignee: Robert Bosch GmbH, Stuttgart, Germany

[21] Appl. No.: 09/174,404

[22] Filed: Oct. 19, 1998

[30] Foreign Application Priority Data

Oct. 18, 1997 [DE] Germany ........................... 197 46 143

[51] Int. Cl.[7] ........................... F16K 31/02; F02M 45/00; F02M 51/06

[52] U.S. Cl. ..................... 251/57; 239/102.2; 239/533.2; 239/533.4; 239/533.8; 239/533.9; 239/584; 251/11; 251/129.06; 123/472; 310/314

[58] Field of Search .............................. 137/312; 251/11, 251/129.06, 57; 239/102.2, 533.2, 533.4, 533.8, 533.9, 584; 310/326, 327, 323.06, 311, 314; 123/300, 467, 472

[56] References Cited

U.S. PATENT DOCUMENTS

| | | | |
|---|---|---|---|
| 4,022,166 | 5/1977 | Bart | 251/129.06 |
| 4,501,406 | 2/1985 | Walther et al. | 251/129.06 |
| 5,209,453 | 5/1993 | Aota et al. | 251/129.06 |
| 5,280,773 | 1/1994 | Henkel | 251/129.06 |
| 5,810,255 | 9/1998 | Itoh et al. | 251/129.06 |
| 5,979,803 | 11/1999 | Peters et al. | 251/129.06 |

FOREIGN PATENT DOCUMENTS

| | | |
|---|---|---|
| 0 477 400 A1 | 4/1992 | European Pat. Off. . |
| 0477400 | 4/1992 | European Pat. Off. . |
| 1320057 | 6/1973 | United Kingdom . |
| 2296940 | 7/1996 | United Kingdom . |

*Primary Examiner*—George L. Walton
*Attorney, Agent, or Firm*—Ronald E. Greigg; Edwin E. Greigg

[57] ABSTRACT

A valve for controlling fluids which, for its actuation, is provided with a fluid-filled coupling chamber which can be brought to high pressure by virtue of the fact that the valve is disposed between an actuator piston of a piezoelectric actuator and a piston that actuates a valve member and it is used for force and path transmission. To compensate for a leakage in the coupling chamber, a filling valve is provided, which is disposed on the piston that actuates the valve member and is switched by this piston with each stroke of the device. In this manner, the coupling chamber contains a largely constant volume and can also compensate for slight fill level changes caused by temperature differences. The valve is designated for use in fuel injection devices for internal combustion engines of motor vehicles.

23 Claims, 4 Drawing Sheets

VALVE FOR CONTROLLING FLUIDS

BACKGROUND OF THE INVENTION

The invention relates to a valve for controlling fluids. EP 0 477 400 has disclosed a valve of this kind. In this instance, the actuation piston of the valve member is disposed so that it can move in a sealed fashion in a smaller diameter part of a stepped bore, whereas a larger diameter piston, which is moved by a piezoelectric actuator, is disposed in a larger diameter part of the stepped bore. A hydraulic coupling chamber is mounted between the two pistons in such a way that when the larger piston is moved by the piezoelectric actuator for a particular distance, the actuating piston of the valve member is moved for a distance that is enlarged by the translation ratio of the stepped bore diameter.

With valves of this kind, there is a problem in that length changes occur in the piezoelectric actuator, in the valve member, or in the valve housing, as well as in the hydraulic column of the coupling chamber, and these changes must be compensated for. Since the piezoelectric actuator produces a pressure to open the valve in the coupling chamber, this pressure also leads to a loss in the coupling chamber fluid. In order to prevent an evacuation of the coupling chamber, a refilling is necessary. The prior art mentioned at the beginning has disclosed the execution of a tolerance compensation by means of a predetermined leakage. This has the disadvantage that a continuous, open connection is provided in both possible flow directions between the coupling chamber and e.g. a reservoir, because of which the resulting flexibility of the hydraulic chamber negatively influences the functional behavior of the piezoelectric actuator. The known device is embodied so that the hydraulic fluid is hermetically enclosed in the housing. In particular, a consequently enlarged volume leads to a compressibility that reduces the transmission rigidity of the hydraulic column formed by the coupling chamber.

OBJECT AND SUMMARY OF THE INVENTION

The valve according to the invention has the advantage over the prior art that the coupling chamber always remains sufficiently filled and by way of the filling valve, coupling fluid can only flow in the direction of a coupling chamber from an existing refilling reservoir that is not limited in volume. A disadvantageous length change of the entire device is thus prevented and as a result, a high transmission rigidity is achieved. This is also true if the piezoelectric actuator, the valve, or the housing should change in length, e.g. upon heating, because a length change of this kind in the coupling chamber is compensated for by means of leaks. It is furthermore advantageous that the device has a simple design and functions in a safe and reliable manner.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
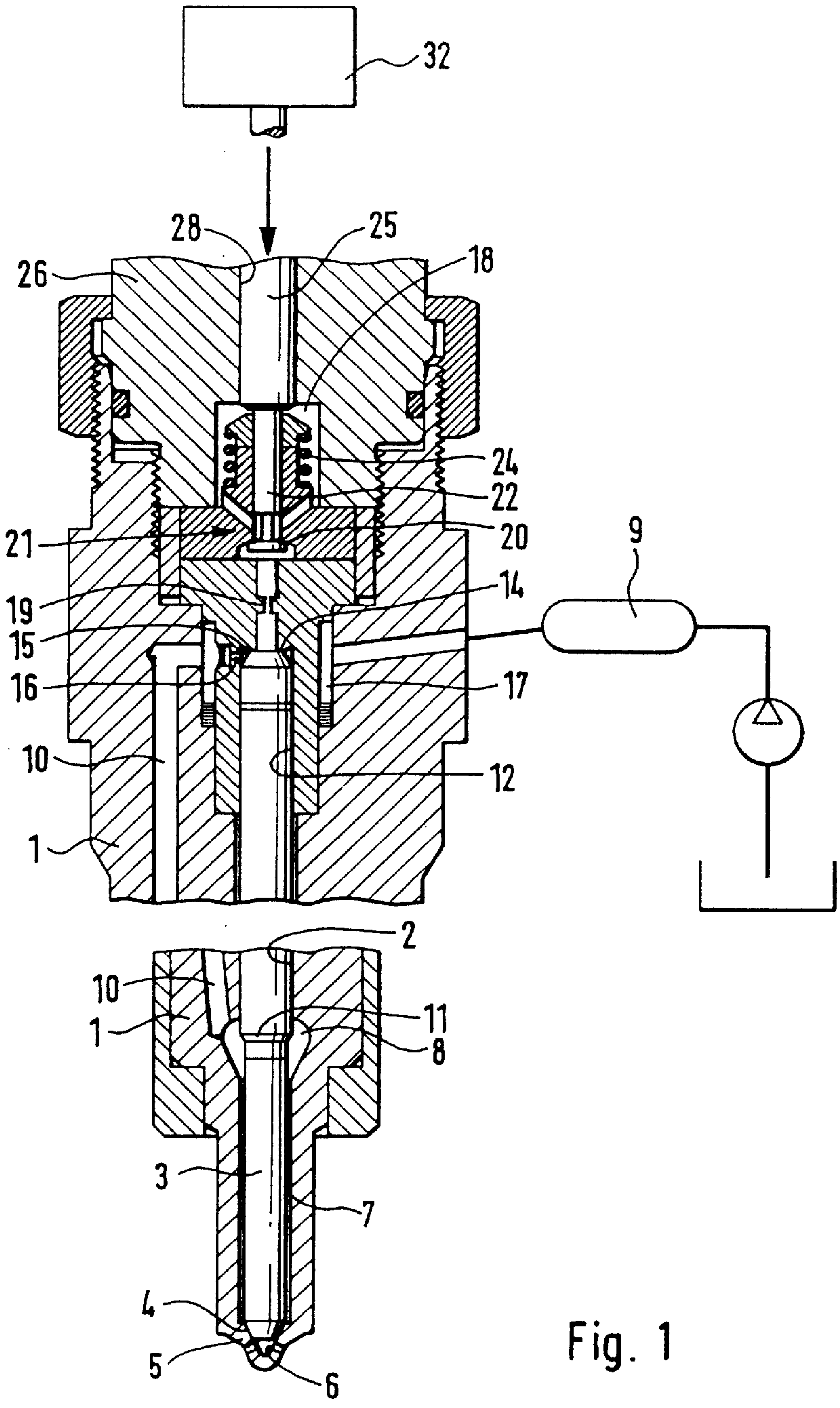
FIG. 1 is a section through a fuel injection valve.

The valve according to the invention is used in a fuel injection valve whose essential parts are shown in the sectional view in FIG. 1. This injection valve has a valve housing 1 in which a valve needle 3 is guided in a longitudinal bore 2, which valve needle can be pre-loaded in the closing direction by means of a closing spring in a known manner not shown in detail here. On its one end, the valve needle is provided with a conical sealing face 4, that cooperates with a seat 6 at the tip 5 of the valve housing protruding into the combustion chamber, from which seat injection openings lead, that connect the interior of the injection valve, here the annular chamber 7 that encompasses the valve needle 3 and is filled with fuel under injection pressure, to the combustion chamber in order to thus carry out an injection when the valve needle has lifted up from its seat. The annular chamber is connected to another pressure chamber 8, which continuously communicates with a pressure line 10, by way of which the fuel injection valve is supplied with fuel under injection pressure from a high pressure fuel chamber 9. This high fuel pressure also prevails in the pressure chamber 8, and acts on a pressure shoulder 11 there, by way of which the nozzle needle can be lifted up from its valve seat in a known manner under suitable conditions.

On the other end of the valve needle, it is guided in a cylinder bore 12 and with its end face 14, encloses a control pressure chamber 15 there, which continuously communicates by way of a throttle connection 16 with an annular chamber 17, which like the pressure chamber 8, continuously communicates with the high pressure fuel chamber. Axially, a throttle bore 19 leads from the control pressure chamber 15 to a valve seat 20 of a control valve 21. The valve seat cooperates with a valve member 22 of the control valve, and in the lifted state, this valve member produces a connection between the control pressure chamber 15 and a low pressure chamber 18 filled with hydraulic fluid, in this instance, preferably diesel fuel that is available to the device anyway, and this low pressure chamber 18, in turn, continuously communicates with a relief chamber. A compression spring 24 that loads the valve member 22 in the closing direction is disposed in the low pressure chamber 18 and acts on the valve member 22 in the direction of the valve seat 20 so that in the normal position of the control valve, the connection between the low pressure chamber 18 and the control pressure chamber 15 is closed. The low pressure chamber 18 can also be called a spring chamber in light of the spring that is disposed there. Since the end face area of the valve needle in the region of the control pressure chamber is greater than the area of the pressure shoulder 11, the same fuel pressure in the control pressure chamber that also prevails in the pressure chamber 8 now holds the valve needle 3 in the closed position. If the valve member 22 is lifted, though, the pressure in the control pressure chamber 15, which is de-coupled from the high pressure fuel reservoir 9 by way of the throttle connection 16, is relieved. With the now absent or reduced closing force, the valve needle 3 rapidly opens, if need be, counter to the force of the closing spring and on the other hand, can be brought back into the closed position as soon as the valve member 22 comes into the closed position. From this time on, the original high fuel pressure in the control pressure chamber 15 builds up again rapidly by way of the throttle connection 16.

The control valve according to the invention has a piston 25 designed for actuating it, which acts on the valve member 22 and can be actuated by means of a piezoelectric actuator 32. The piston 25 is guided in a sealed fashion in a guide bore 28 disposed in a housing part 26 of the fuel injection valve and as can be inferred from FIG. 2, defines with its end face 29 a coupling chamber 30, which is filled with hydraulic fluid, fuel in this instance, and on its opposite wall, this coupling chamber is closed off by a larger diameter actuator piston 31 guided in an actuator guide bore 39, which piston is part of the piezoelectric actuator 32 and additionally, can also be coupled to the piezoelectric actuator with a frictional, non-positive connection by means of a spring 49, 65 (see FIGS. 3 and 6) disposed in the coupling chamber. Due to the different piston areas of the two pistons 25 and 31, the coupling chamber 30 functions as a translation chamber by virtue of the fact that it translates a small stroke of the piezoelectric actuator piston 31 into a larger stroke of the piston 25 that actuates the control valve 21. Upon excitation of the piezoelectric actuator, which in principle can produce only small actuation paths, consequently the piston 25 is adjusted with a translated adjustment path and the valve member 22 is lifted up from its seat 20. This results in a relief of the control pressure chamber, which in turn brings about the opening of the valve needle 3. With the functioning of the control valve and with the pressure translation, very high pressures occur in the coupling chamber 30. In order to prevent a filling loss due to leakage along the piston guides, despite this loading of the enclosed hydraulic fluid, and in order to also compensate for fill level changes due to volume change of the fluid in the coupling chamber 30 when there are temperature changes, a filling valve 33 is provided that is connected to the coupling chamber 30.

Figure 2:
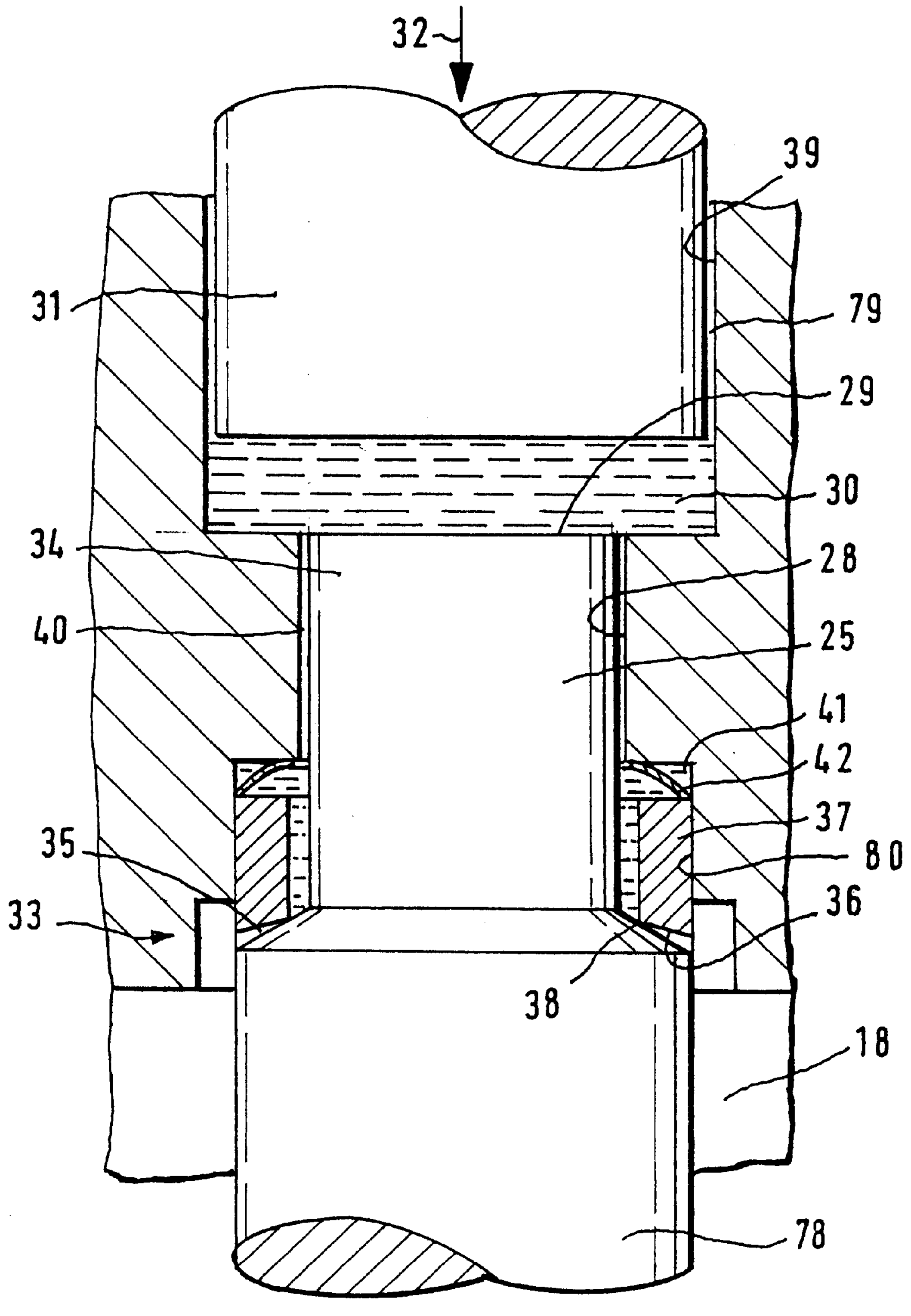
FIG. 2 shows a first exemplary embodiment of a filling valve.

In particular, in the exemplary embodiment according to FIG. 2, this filling valve 33 is embodied so that the piston 25 is embodied as a stepped piston, whose smaller diameter piston part 34 is guided in a sealed fashion in the guide bore 28 and on its end face, this piston part 34 defines the coupling chamber 30 and by way of a shoulder that constitutes a valve seat 35 for the filling valve 33, transitions into a larger diameter piston part 78, which dips into the spring chamber 18. A closing body 37 of the filling valve 33 is constituted by a piston ring that is guided in a sealed fashion in a bore 80, which is disposed in the valve housing 1 and adjoins the guide bore, and toward the side of the valve 21, this piston ring has an end face embodied as a sealing face 36 that is embodied as conical and has an annular sealing edge 38 that comes into contact with the valve seat 35. A space is provided between the inner jacket face of the closing body 37 and the piston part 34.

By way of the actuator guide bore 39 and the guide bore 28 of the piston 25, leaks can occur, primarily when there is a pressure increase in the coupling chamber 30. There is a guidance-induced annular leakage gap 79 between the actuator piston 31 and the actuator guide bore 39. However, there is also an intentional leakage connection between the spring chamber 18 and the coupling chamber 30, e.g. by way of an annular leakage gap 40 formed between the guide bore 28 and the piston part 34, which permits a filling of the coupling chamber 30 from a control chamber 41 by way of the filling valve 33. To that end, the filling valve 33 is embodied as a check valve by virtue of the fact that the closing body 37 is loaded in the direction of the valve seat 35 by means of a spring 42 that is supported against the valve housing.

Operation

Upon opening of the control valve, the valve seat 35 affixed to the piston 25 lifts up and the control chamber 41 is filled from the leakage oil chamber. Upon closing of the valve, the piston ring 37 presses against the valve seat 35 and seals off the control chamber 41. As a result, an overpressure is produced in the control chamber, which can be adjusted by means of the selectable rigidity of the control chamber 41. The overpressure produces a leakage in the leakage connection 40, which is directed toward the coupling chamber 30. The coupling chamber is then filled in this manner. A further advantage is that the piston ring 37 acts as an oscillation damper during the closing of the filling valve 33.

Figure 3:
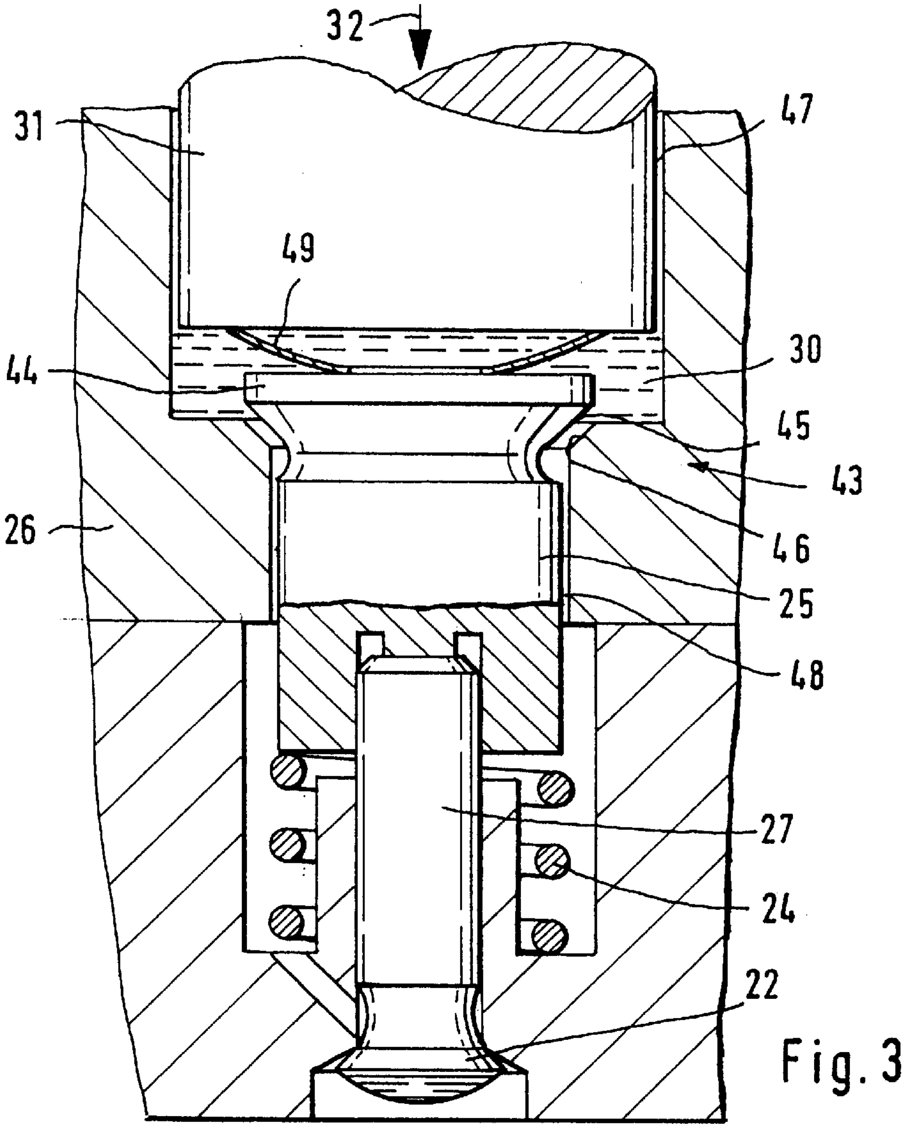
FIG. 3 shows a second exemplary embodiment of a filling valve.

FIG. 3 shows a filling valve 43 that is disposed directly at the coupling chamber 30. In this instance, a piston 25 has a head 44 whose underside is embodied as a closing body 45 of the filling valve 43. A valve seat 46 that is designated for the closing body 45 is provided fixed to the housing 26. It is used as a valve stop. Two guide leakages are represented with the gaps 47 and 48 in the piston 25 and actuator piston 31. A shaft 27 of a mushroom-shaped valve member 22 is press-fitted into the piston 25, and a compression spring 24 presses the piston 25 against the coupling chamber 30 in which another spring 49 is additionally disposed.

Operation

When there is high pressure in the coupling chamber 30, fluid travels outward by way of the two connections 47 and 48 guiding the pistons 25 and 31. With the next valve stroke, the leakage produced in the coupling chamber 30 must be compensated for by refilling. In order to reduce the leakage, the end stop for opening the valve member 22 is built into the housing 26 as a fixed valve seat 46. At the stroke end of the valve member 22, the highest pressure prevails in the coupling chamber 30. This high pressure is sealed off by the closing of the filling valve 43. Both piston guiding connections 47 and 48 are used in the filling of the coupling chamber 30 after the valve stroke. No sealing seat can be attached to the actuator piston 31 since the coupling chamber 30 represents the length compensation for the piezoelectric actuator 32.

Figure 4:
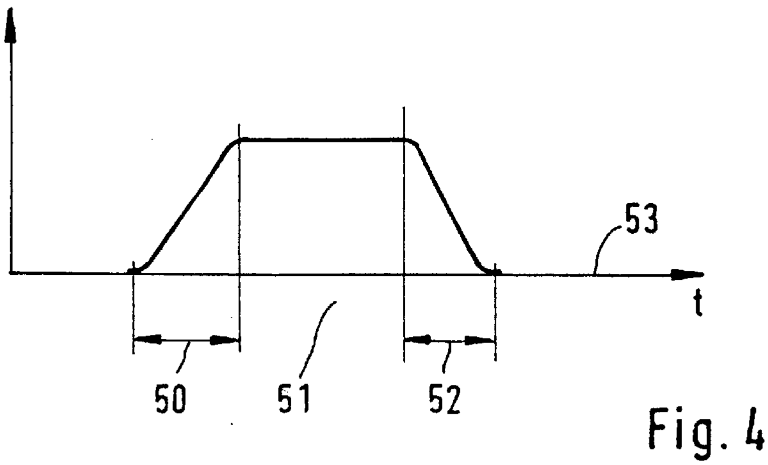
FIG. 4 shows a diagram of the filling over the course of time.

In the diagram according to FIG. 4, the stroke of the valve is plotted over time T. It is shown that in one region 50, both pistons 25 and 31 have leakage, in a subsequent time period 51, the piston 25 is sealed off by the closing of the filling valve 43, while the piston 31 continues to leak. Then in another region 52, both pistons 25 and 31 leak again, while in a subsequent time period 53, the filling of the coupling chamber 30 takes place.

Figure 5:
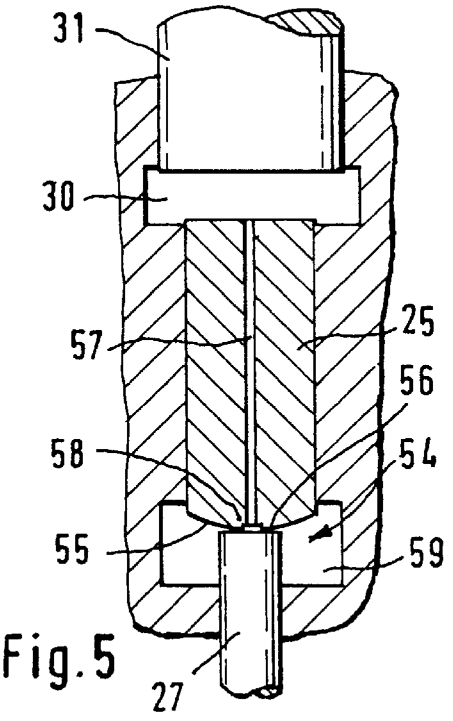
FIG. 5 shows a third exemplary embodiment of a filling valve.

The devices represented in FIGS. 5 to 9 are all equivalent by virtue of the fact that they have a piston 25 provided with a through bore and that these through bores are provided with a filling valve on one side of the piston 25. In FIG. 5, a filling valve, which is disposed on the side of the piston 25 remote from the coupling chamber 30, is given the reference numeral 54. This valve is constituted by means of a valve seat 55 on an end face of the piston 25 and by means of a closing member 56 on the shaft 27, which is only adjusted by means of a correspondingly embodied end face of the shaft 27. Preferably the piston 25 is embodied as ball-shaped on its end face, with a shallow radius, in order to compensate for an angular offset from the piston 25 and the control valve 21 and its facing stop. Finally, the piston 25 is provided over its entire length with a through bore 57 whose discharge mouth 58 is enlarged in diameter to reduce wear (lower Hertzian stress) and is disposed in a leakage fluid chamber 59.

The opening cross section of the filling valve 54 is controlled by way of the control valve 21 itself, in fact by way of the shaft 27 of the control valve. If the pressure in the coupling chamber 30 is lower than beneath the piston 25, the piston 25 lifts up and unblocks the through bore 57. It is also possible to insert a weak spring into the coupling chamber 30, as shown in the exemplary embodiments according to FIGS. 6, 8, and 9, e.g. a flat spring with c=1N/mm spring rigidity and with F=0.5N of initial stress. A spring of this kind presses the piston 25 against the shaft of the control valve 21 in the state in which it is not triggered and is pressure-compensated. The initial stress of the spring then determines the pressure differential at which the piston 25 lifts up from the shaft 27, which is held against its valve seat 20 by means of the closing spring 24 of the control valve 21. The advantage of this design lies in a very low structural cost.

Figure 6:
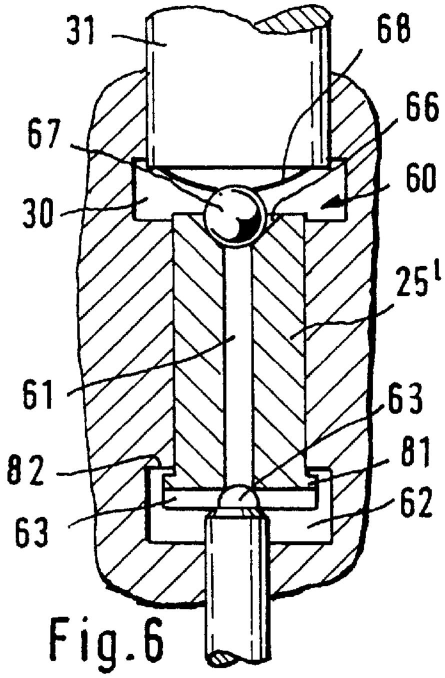
FIG. 6 shows a modification of the design according to FIG. 5.
Figure 7:
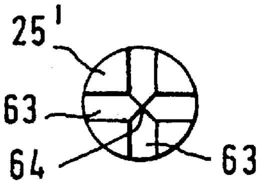
FIG. 7 shows a detail of the embodiment according to FIG. 6.

FIG. 6 shows a variant in which a filling valve 60 is disposed directly at the coupling chamber 30. Here, too, the piston 25' is provided over its entire length with a through bore 61, which on its end remote from the coupling chamber 30 ends in a crisscross slot 63 that is disposed in a leakage fluid chamber 62 (see FIG. 7) and is unblocked by the end face of the shaft 27 of the valve member 22. The piston 25' also has an outer collar 81 on its end that dips into the leakage fluid chamber, which collar permits the piston to lift up from the closing member 22 of the control valve 21 with a slight amount of play, which valve member 22 is disposed in the closed position, before the piston, with its outer collar, comes into contact with an end wall 82 of the leakage fluid chamber.

Figure 8:
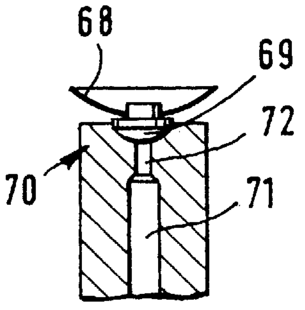
FIG. 8 shows a modification of the design according to FIG. 6.

The filling valve 60 has a hollow, conical valve seat 66 at the upper discharge mouth of the through bore 61. A ball cooperates with this valve seat 66 as a closing body 67, and this ball is subjected to the force of a spring 68 that is disposed in the coupling chamber 30 and is supported against the actuator piston 31. If the pressure below the closing body 67 is greater than above it, then the closing body lifts up after the piston 25', with its outer collar 81, has come into contact against the end wall 82, and a pressure compensation between the coupling chamber and the leakage fluid chamber 62 occurs with the opening of the through bore 61. In order to keep the volume of the coupling chamber 30 as small as possible, the ball closing body 67 is sunk in the piston. In order to save even more space in the coupling chamber 30, a closing body 69 of a filling valve 70 can also be embodied merely as a ball section, as shown in FIG. 8. With a shallow valve seat angle, a small bore diameter of the through bore is required. Therefore, in the embodiment according to FIG. 8, a through bore 71 is provided with a narrowing 72 directly beneath the closing body 69; beneath this, the through bore 71 is wider again.

Figure 9:
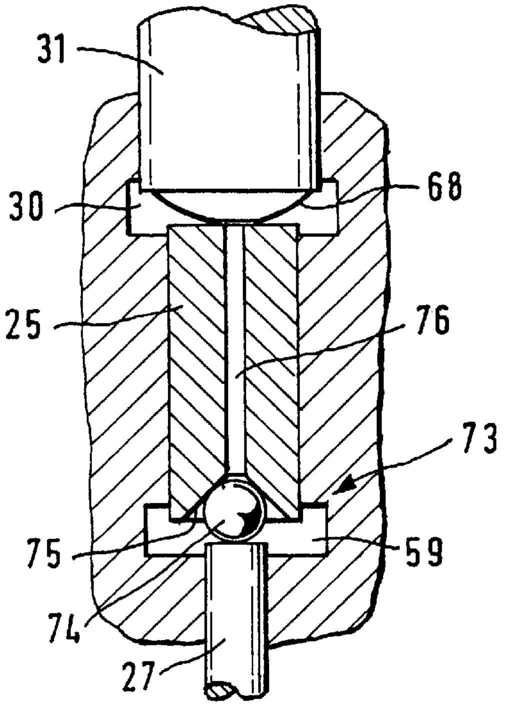
FIG. 9 shows another embodiment of the designs according to FIGS. 6 and 8.

FIG. 9 demonstrates that it is also possible to provide a filling valve 73 with a ball as a closing body 74 and with a valve seat 75 on the lower end of the piston 25. A through bore here has the reference numeral 76.

In a design of this kind, in the triggered state, i.e. when there is increasing pressure in the coupling chamber 30, a secure sealing of the coupling chamber 30 in the direction of the leakage fluid chamber 59 or 62 and a reliable compensation of the angular offset and facing stop can be achieved. A principle difference from the above-mentioned exemplary embodiments, however, is comprised in that a greater pressure beneath the closing body 74 presses this closing body against its valve seat 75 and thus does not permit any pressure compensation. Here, the refilling occurs when the control valve 21 strikes against its valve seat 20 in the closing operation. Then due to its mass inertia, the piston 25 travels further and unblocks the through bore 76 to the coupling chamber 30.

The common advantage of all of these variants is comprised in that the design is very simple, which achieves a large degree of functional reliability. Finally, the volume of the coupling chamber 30 is very small so that a high coupling chamber rigidity is achieved.

The foregoing relates to preferred exemplary embodiments of the invention, it being understood that other variants and embodiments thereof are possible within the spirit and scope of the invention, the latter being defined by the appended claims.

We claim:

1. A valve (21) for controlling fluids, comprising a valve member (22) that is acted on in a closing direction by a compression spring (24) so that the valve member rests against a valve seat (20), a piston (25) which actuates the valve member, said piston, has a first end surface as a moving wall, which closes off a first side of a coupling chamber (30) filled with hydraulic fluid, said coupling chamber is defined on a second side by an actuator piston (31) of a piezoelectric actuator (32), said piezoelectric actuator has a work stroke which generates a pressure increase in the coupling chamber (30) which adjusts the valve member (22) in a valve opening direction counter to a force of the compression spring (24), the piston (25) is guided in a guide bore (28) and a leakage connection (40) is constituted between the guide bore and a jacket face of the piston (25), the leakage connection connects the coupling chamber (30) to a low pressure chamber (18, 56, 62), the low pressure chamber supplies and receives hydraulic fluid, and via a connection between the coupling chamber (30) and the low pressure chamber (18), a filling valve (33, 43, 54, 60, 70, 73) having a valve seat (38) is provided, and the valve seat is formed by a shoulder (35) of the piston (25).

2. The valve according to claim 1, in which a control chamber (41) is provided between the coupling chamber (30) and the filling valve (33), and the coupling chamber (30) is refilled by way of the leakage connection (40) from the control chamber.

3. The valve according to claim 2, in which the piston (25) is embodied as a stepped piston (25), with a larger diameter stepped piston part (78) and a smaller diameter stepped piston part (34), the smaller diameter piston part (34) is oriented toward the coupling chamber (30) that forms said first side and has a shoulder disposed between the smaller diameter part and the larger diameter part, said shoulder is a valve seat (35) as part of the filling valve provided by said piston (25) and serving as a closing body (37) of the filling valve (33), said closing body is loafed in a direction of the valve seat (35) by the compression spring (42).

4. The valve according to claim 3, in which the closing body of the filling valve (33) is constituted by an end face (36) of a piston ring (37) which, on a jacket face of said piston ring, is guided in a sealed fashion in a bore (80) that adjoins the guide bore (28).

5. The valve according to claim 1, in which the piston (25) is embodied as a stepped piston (25), with a larger diameter stepped piston part (78) and a smaller diameter stepped piston part (34), the smaller diameter piston part (34) is oriented toward the coupling chamber (30) that forms said first side and has a shoulder disposed between the smaller diameter part and the larger diameter part, said shoulder is a valve seat (35) as part of the filling valve provided by said piston (25) and serving as a closing body (37) of the filling valve (33), said closing body is loaded in a direction of the valve seat (35) by the compression spring (42).

6. The valve according to claim 5, in which the closing body of the filling valve (33) is constituted by an end face (36) of a piston ring (37) which, on a jacket face of said piston ring, is guided in a sealed fashion in a bore (80) that adjoins the guide bore (28).

7. The valve according to claim 6, in which the end face (36) is conical and has an annular sealing edge (38).

8. The valve according to claim 7, in which the piston (25) is firmly coupled to the valve member (22) and is acted on by the compression spring (24) in the direction of the coupling chamber (30), wherein the filling valve is opended when the valve member (22) is in a closed position and is closed when the valve member (22) is opened.

9. The valve according to claim 1, in which the piston (25) is provided with a head (44) that is disposed in the coupling chamber (30) and is embodied as a closing body (45) of the filling valve (43), and said closing body cooperates with an infeed mouth of the guide bore (28) into the coupling chamber (30) which forms the valve seat (46) of the filling valve.

10. The valve according to claim 1, in which the piston (25) is provided with a through bore (57, 61, 71, 76) by which the coupling chamber (30) is connected to said low pressure chamber (59, 62) and a discharge mouth of the through bore on one of the end faces of the piston (25) as a part of said filling valve is controlled by means of a valve member of the filling valve (54, 60, 70, 73).

11. The valve according to claim 10, in which the end face has a hollow, conical sealing face (66, 75) encompassing an exit of the through bore, against which a closing body (67, 69, 74) of the filling valve (60, 70) is pressed by means of a spring (68).

12. The valve according to claim 11, in which the closing body (67, 74) is a ball.

13. The valve according to claim 11, in which the closing body (69) is embodied as a section of a ball.

14. The valve according to claim 11, in which the sealing face (66) is disposed on a side of the piston (25) oriented toward the coupling chamber (30).

15. The valve according to claim 12, in which the sealing face is disposed on a side of the piston (25) remote from the coupling chamber (30).

16. The valve according to claim 15, in which the spring is supported against the actuator piston (31).

17. The valve according to claim 10, in which the sealing face (66) is disposed on a side of the piston (25) oriented toward the coupling chamber (30).

18. The valve according to claim 10, in which a discharge mouth (58) of the through bore (57) into the leakage fluid chamber (59) is encompassed by the sealing face, which cooperates as a valve seat with the end face of the valve member (22, 27) that protrudes into the leakage fluid chamber.

19. The valve according to claim 18, in which the discharge mouth (58) of the through bore (57) is enlarged in its diameter.

20. The valve according to claim 18, in which the sealing face (56) is an end face of the piston (25) that is embodied as ball-shaped.

21. The valve according to claim 18, in which the sealing face (56) is an end face of the piston (25) that is embodied as ball-shaped.

22. The valve according to claim 10, in which the sealing face (66) is disposed on a side of the piston (25) oriented toward the coupling chamber (30).

23. The valve according to claim 10, in which the sealing face (66) is disposed on a side of the piston (25) oriented toward the coupling chamber (30).

* * * * *